US006351373B1

(12) United States Patent
Le et al.

(10) Patent No.: US 6,351,373 B1
(45) Date of Patent: Feb. 26, 2002

(54) CAM AND HINGE MECHANISM FOR ANGULAR INSERTION

(75) Inventors: Bao G. Le, Orange; Derek T. Nguyen, Foothill Ranch, both of CA (US)

(73) Assignee: Gateway, Inc., North Sioux City, SD (US)

(*) Notice: Subject to any disclaimer, the term of this patent is extended or adjusted under 35 U.S.C. 154(b) by 0 days.

(21) Appl. No.: 09/563,249

(22) Filed: May 2, 2000

(51) Int. Cl.[7] .................................................. G06F 1/16

(52) U.S. Cl. ....................... 361/683; 361/681; 361/682; 361/683; 361/686; 16/334; 16/335; 16/340; 16/341; 16/342; 16/325; 16/327; 248/183; 248/917; 248/923; 403/119; 403/120; 403/121; 403/146

(58) Field of Search ................................ 361/683, 681, 361/686, 682; 16/334, 335, 340–342, 325, 327; 248/183, 917, 923; 403/119–121, 146

(56) References Cited

U.S. PATENT DOCUMENTS

| | | | | |
|---|---|---|---|---|
| 4,853,830 A | | 8/1989 | Corfits et al. | 361/391 |
| 5,139,430 A | | 8/1992 | Lewis et al. | 439/157 |
| 5,481,431 A | | 1/1996 | Siahpolo et al. | 361/685 |
| 5,668,696 A | | 9/1997 | Schmitt | 361/685 |
| 5,765,933 A | | 6/1998 | Paul et al. | 312/332.1 |
| 5,781,408 A | | 7/1998 | Crane, Jr. et al. | 361/683 |
| 5,790,373 A | | 8/1998 | Kim et al. | 361/685 |
| 5,951,312 A | | 9/1999 | Horng | 439/165 |
| 6,108,868 A | * | 8/2000 | Lin | 16/340 |

* cited by examiner

*Primary Examiner*—Leo P. Picard
*Assistant Examiner*—Yean-Hsi Chang
(74) *Attorney, Agent, or Firm*—Lyon & Lyon, LLP

(57) ABSTRACT

A hinge engages a cam such that the hinge first rotates relative to the cam, then linearly engages the cam. Preferably, the hinge includes a guiding post that rides along a raised arched surface on the cam during the rotary motion of the hinge. Linear motion between the hinge and the cam preferably begins when the guiding post rides off the end of the arched surface. The rotary motion of the hinge is constrained by one or more engagement assemblies. In a preferred embodiment, one or more cams are mounted on a receiving structure and one or more hinges are mounted in corresponding locations on a detaching structure, where said detaching structure is physically separable from the receiving structure. Engagement between the one or more cams and the one or more corresponding hinges allows the detaching structure to first rotate relative to, then linearly engage, the receiving structure, providing for reliable blind mating between connectors on the detaching structure and connectors on the receiving structure.

14 Claims, 5 Drawing Sheets

CAM AND HINGE MECHANISM FOR ANGULAR INSERTION

BACKGROUND OF THE INVENTION

The field of the present invention is connector assemblies for use in personal computers.

The personal computer revolution has placed computers in homes and businesses around the world. While these computers are typically designed for ease of use, they are not always designed for ease of building or upgrading. Building a computer involves assembling a variety of components; upgrading involves adding or swapping out components. The processes of assembling, adding, and swapping out components typically require the disassembly of a portion of the computer, and the connection and/or disconnection of electrical connectors.

A pin-and-socket connector is a type of electrical connector commonly used to interconnect components and assemblies within a computer. Such connectors are well known in the art and have known advantages and disadvantages. One disadvantage of pin-and-socket connectors is the relative ease with which a pin can become bent during connection. If the connectors are not aligned properly when a person attempts to press them together, one or more pins will be forced onto a hard surface of the mating connector instead of being inserted into a corresponding socket, potentially deforming the pin such that it is no longer aligned or shaped properly to enter the corresponding socket. Such damage cannot be fixed easily. Rather, the connector and potentially the component connected to it may have to be discarded.

When a person connecting two mating pin-and-socket connectors is able to see both connectors and has adequate space to handle both, that person can easily align the two and watch them as they are connected, in order to prevent misalignment and the resulting possibility of damage to the pins. However, many connections within a computer are blind connections, where the person making the connection cannot see the two connectors, but must instead rely on touch or on intuition in order to ensure that the two connectors are aligned and properly connected. The results of connecting together two mating connectors based on intuition or touch are often poor, resulting in bent or broken pins and expensive repair or replacement of components. Such a problem is even more acute when circuit boards such as a motherboard and daughterboard are connected together via pin and socket connectors. A motherboard assembly is typically expensive and relatively brittle, and damage to the motherboard can be costly to repair, if repair is even possible.

SUMMARY OF THE PREFERRED EMBODIMENTS

The present invention is directed to a cam and hinge assembly for use in a personal computer.

In one preferred embodiment, a hinge engages a cam such that the hinge first rotates relative to the cam, and thereafter linearly engages the cam.

In one innovative aspect, the hinge may include a guiding post that rides along the cam during the rotary motion of the hinge. In a further aspect of a preferred embodiment, the cam may include a raised arched surface along which the guiding post rides during the rotary motion of the hinge, and linear motion between the hinge and cam may begin when the guiding post rides off the end of the arched surface.

In another aspect of a preferred embodiment, the rotary motion of the hinge may be constrained by one or more engagement assemblies, and each engagement assembly may engage an axle on the cam to stop linear motion of the hinge relative to the cam.

In another aspect of a preferred embodiment, one or more cams are mounted on a receiving structure and one or more hinges are mounted in corresponding locations on a detaching structure, where the detaching structure is physically separable from the receiving structure. Engagement between the one or more cams and the one or more corresponding hinges allows the detaching structure to first rotate relative to, then linearly engage, the receiving structure, providing for reliable blind mating between connectors provided on the detaching structure and receiving structure. In one presently preferred embodiment, the receiving structure may comprise a computer chassis and the detaching structure may comprise an access or panel door.

DETAILED DESCRIPTION OF THE PREFERRED EMBODIMENTS

Figure 1:
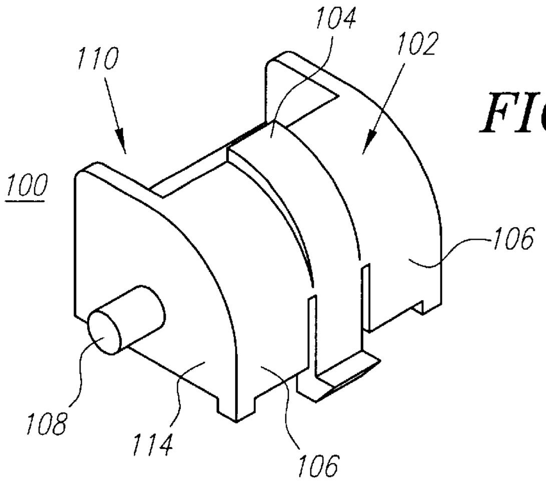
FIG. 1 is a perspective view of a cam in accordance with a preferred embodiment of the present invention.
Figure 2:
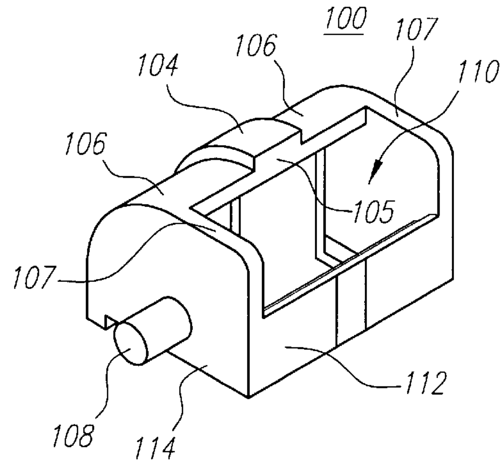
FIG. 2 is a perspective view of the cam shown in FIG. 1, at a reverse angle from FIG. 1.

Referring to FIG. 1, a cam 100 is shown. The cam 100 has an engagement surface 102, which is preferably divided into an arched surface 104 and a flanking surface 106 on both sides of the arched surface 104. Each flanking surface 106 is preferably curved in such a way that its frontmost end is substantially vertical and its rearmost end 107 (as shown in FIG. 2) is substantially horizontal, with a smooth and continuous curvature between. In a preferred embodiment, the cross-section of the curvature of each flanking surface 106 takes the form of an arc of a circle. However, other smooth and continuous curvatures are within the scope of the preferred embodiment, such as an arc of an ellipse. Preferably, the flanking surfaces 106 are shaped such that the radius of curvature of the flanking surfaces 106 is substantially constant laterally across the cam 100.

The arched surface 104 preferably begins substantially coplanar with the adjacent flanking surfaces 106. Moving upward and rearward along the engagement surface, the arched surface 104 rises from the flanking surfaces 106, extending outward and upward relative to the flanking surfaces 106 to form a ridge on the engagement surface 102. In a preferred embodiment, the curvature of the arched surface 104 takes the form of an arc of an ellipse. However, other smooth and continuous curvatures are within the scope of the preferred embodiment, such as an arc of a circle having a larger radius of curvature than that of the flanking surfaces 106. Preferably, the arched surface 104 is shaped such that the radius of curvature of the arched surface 104 is substantially constant across its lateral dimension. In a preferred embodiment, the arched surface 104 is centered on the engagement surface 102. However, the arched surface 104 need not be centered on the engagement surface 102. Further, it is within the scope of the preferred embodiment that the arched surface 104 is located on one end of the cam 100 such that only one flanking surface 106 is present, located to one side of the arched surface 104. It is also contemplated that the arched surface 104 may be flush with the engagement surface 102.

Referring as well to FIG. 2, an opening 110 in the cam 100 is seen. Viewed from the top, the opening 110 preferably has a rectangular aspect, such that the rearmost end 105 of the arched surface 104 is adjacent to the opening 110, and the rearmost ends 107 of the flanking surfaces 106 extend along the ends of the opening 110 to the rear of the cam 100. The rearmost end 105 of the arched surface 104 is preferably located adjacent the opening 110. At its rearmost end 105, the arched surface 104 is higher than the adjacent flanking surfaces 106. A rear wall 112 of the cam 100 is located behind the opening 110.

The cam 100 preferably has two side walls 114, oriented substantially parallel to one another and substantially parallel to the radii of curvature of the arched surface 104 and the flanking surfaces 106. An axle 108 extends from each side wall 114 of the cam 100. The axle 108 preferably takes the shape of a right cylinder. The axles 108 are preferably aligned with one another such that the centerline of each axle 108 is substantially the same.

Figure 3:
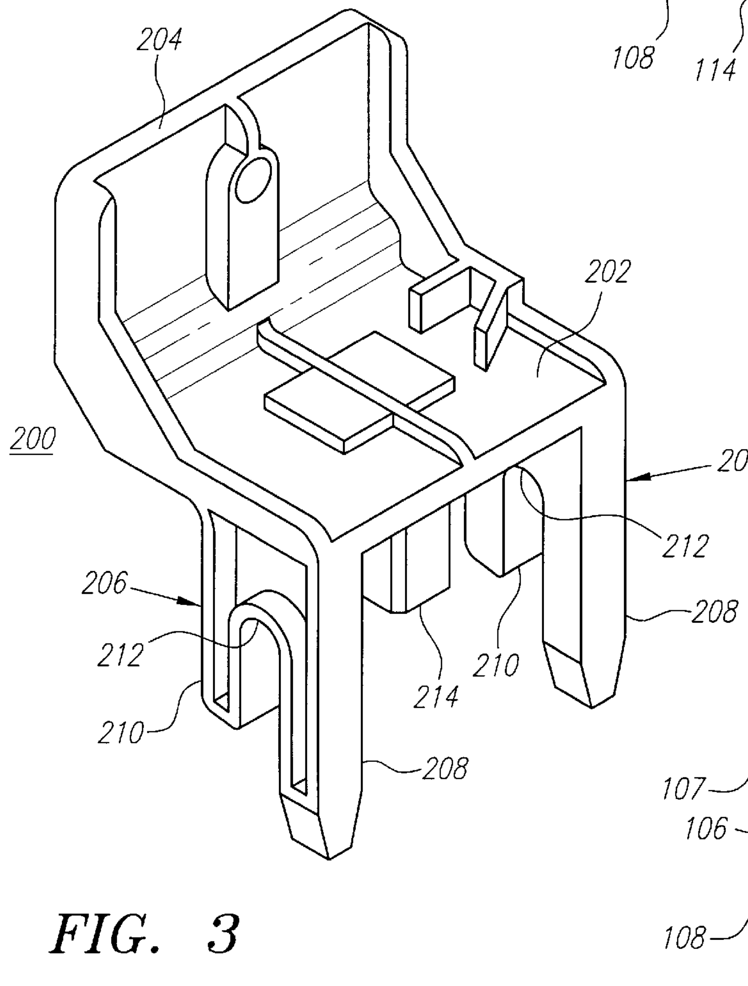
FIG. 3 is a perspective view of a hinge.

Referring to FIG. 3, a hinge 200 is shown. In a preferred embodiment, the hinge 200 includes a base 202. An attachment surface 204 is preferably attached to the base 202, configured relative to the base 200 such that the hinge 200 can be attached to an external item or assembly via the attachment surface 204. The hinge 200 preferably includes two engagement assemblies 206 located at opposite lateral sides of the hinge 200 from one another, each engagement assembly 206 attached to and extending substantially downward from the base 202. In a preferred embodiment, each engagement assembly 206 includes a restraining leg 208 and an alignment leg 210, with an engagement socket 212 located between the restraining leg 208 and the alignment leg 210. The restraining legs 208 are preferably substantially the same length as one another. The alignment legs 210 are also preferably substantially the same length as one another. Each engagement socket 212 preferably possesses a substantially semicircular curvature in a direction open downward from the base 202.

The hinge 200 also includes a guiding post 214 extending substantially downward from the base 202. The guiding post 214 is preferably substantially as wide as the arched surface 104. In a preferred embodiment, the bottom of the guiding post 214 is substantially flat. The guiding post 214 preferably takes the shape of a right rectangular solid having rounded or beveled edges, such that its cross section and its bottom are both substantially rectangular. However, other shapes of the guiding post 214 are within the scope of the preferred embodiment, such as cylinders. Further, the cross-section of the guiding post 214 need not be constant; by way of example and not limitation, the guiding post 214 may be cylindrical where it is attached to the base 202, and transition to a right rectangular solid at its distal end. The guiding post 214 is preferably substantially laterally centered on the base 202.

Several dimensions and features on the cam 100 and the hinge 200 are preferably constructed to correspond to one another. Each engagement socket 212 is adapted to engage the corresponding axle 108 on a cam 100, and therefore preferably has a radius of curvature larger than that of the corresponding axle 108 to allow it to receive and engage the corresponding axle 108. Further, the restraining leg 208 and the alignment leg 210 of an engagement assembly 206 are spaced apart further than the diameter of the corresponding axle 108, to allow the axle 108 substantially unimpeded access to the engagement socket 212. While the guiding post 214 is preferably substantially laterally centered on the base 202 of the hinge 200 to correspond with the preferred centered location of the arched surface 104 on the cam 100, the lateral positions of the guiding post 214 and the arched surface 104 are mutually dependent, and are selected together to substantially correspond to one another. Thus, if the arched surface 104 is located off center on the engagement surface 102, the guiding post 214 will be located correspondingly offcenter relative to the base 202.

Figure 4:
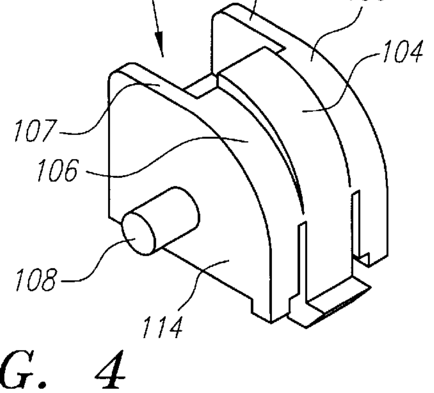
FIG. 4 is a perspective view of a second, narrower-in-width embodiment of a cam in accordance with the present invention.
Figure 5:
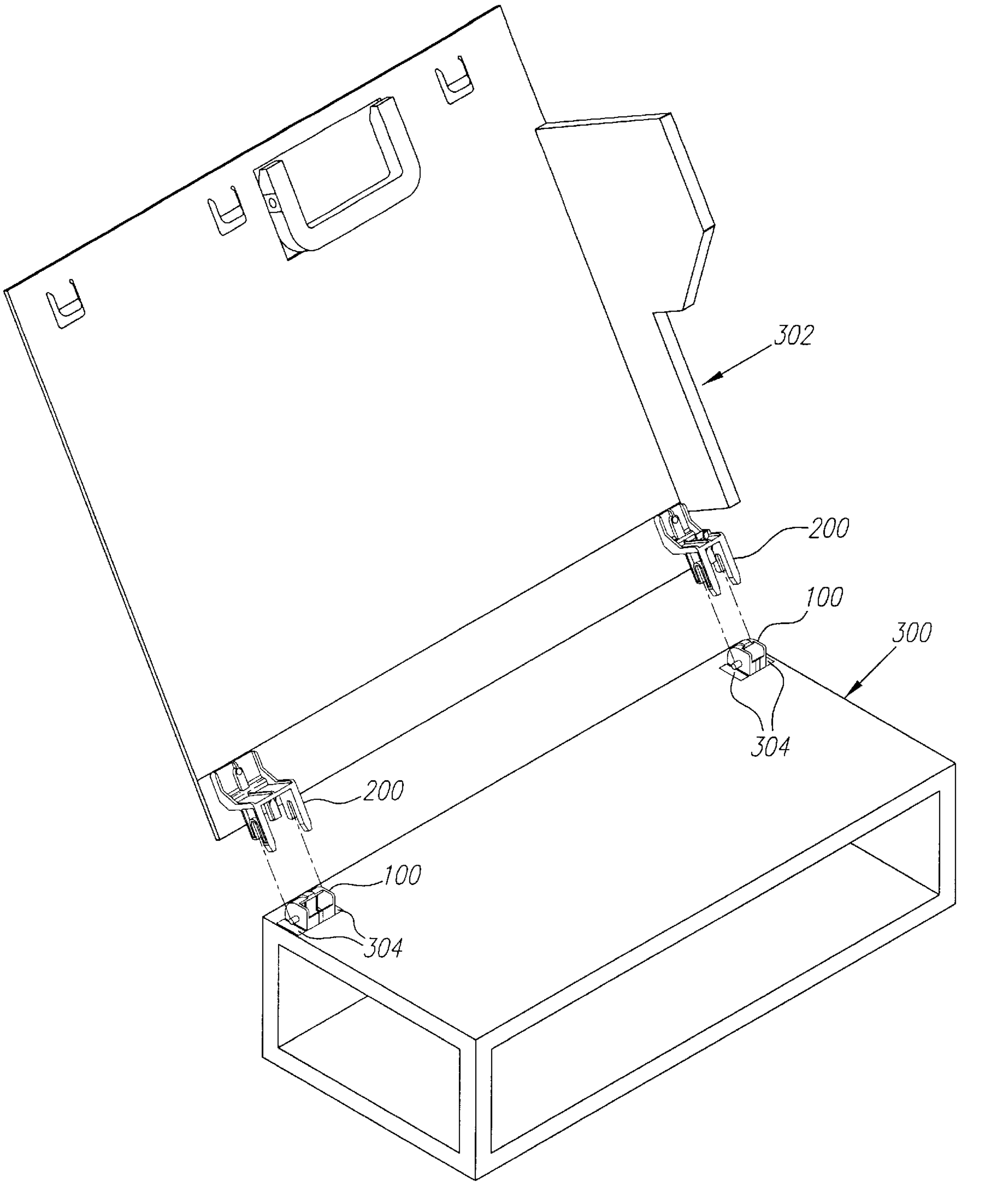
FIG. 5 is a perspective view of a detaching structure having a plurality of hinges and a receiving structure having a plurality of cams.

Referring to FIG. 5, a receiving structure 300 and a detaching structure 302 are shown. The detaching structure 302 is separable from the receiving structure 300. Preferably, two cams 100 are mounted on the receiving structure 300, and two hinges 200 are mounted on the detaching structure 302; however, it is within the scope of the preferred embodiment to utilize at least one additional cam 100 and corresponding hinge 200. It is also within the scope of the preferred embodiment to utilize a single cam 100 and a single hinge 200 that are wide enough to provide adequate stability when the detaching structure 302 engages the receiving structure 300. Where two cams 100 and two hinges 200 are used, the cams 100 and the hinges 200 are spaced corresponding distances apart such that each hinge 200 can engage the corresponding cam 100. The cams 100 and the hinges 200 are located such that after they have been engaged, the receiving structure 300 and the detaching structure 302 are connected together in a desired configuration. In a preferred embodiment, one cam 100 and its corresponding hinge 200 have a different width than the other cam 100 and corresponding hinge 200. By way of example and not limitation, a narrower width cam 100 is shown in FIG. 4. By providing cams 100 and hinges 200 having different widths, registration between the detaching structure 302 and the receiving structure 300 is provided such that the detaching structure 302 can only be inserted into the receiving structure in a single orientation.

Figure 6:
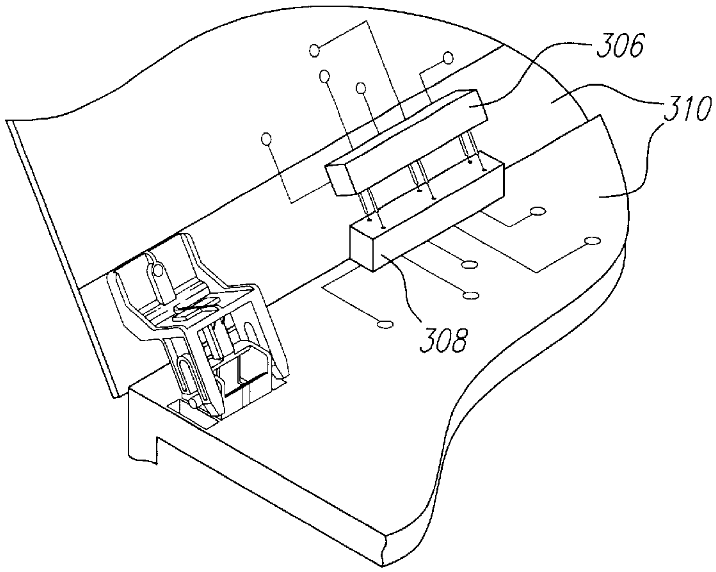
FIG. 6 is a detail view of an electrical connector located on the detaching structure and an electrical connector located on the receiving structure as the detaching structure initially encounters the receiving structure.

In a preferred embodiment, the receiving structure 300 may be a computer chassis and the detaching structure 302 may be an access or panel door. The computer chassis includes an opening covered by the access door in whole or in part. A cam 100 is located adjacent to the opening in the computer chassis, and a hinge 200 is located on the access door in a location corresponding to the location of the cam 100. If multiple cams 100 and hinges 200 are used, they are placed in locations corresponding to one another. Also in a preferred embodiment, as shown in FIG. 6, the receiving structure 300 and the detaching structure 302 both include printed circuit boards 310 which are connected together through the engagement of the cams 100 with the hinges 200. A connector 306 is attached to the printed circuit board 310 attached to the detaching structure 302, and a mating connector 308 is attached to the printed circuit board 310 attached to the receiving structure 300. The connector 306 and the mating connector 308 are typically pin-and-socket connectors, but other types of electrical connectors may be utilized, if desired. The cam 100 and the hinge 200 thus allow a connector 306 on a printed circuit board 310 on an access door to reliably blind mate with a mating connector 308 on a printed circuit board 310 attached to a computer chassis.

The receiving structure 300 preferably includes apertures 304 (as shown in FIG. 5) on both sides of each cam 100 to accommodate the length of the restraining legs 208. The length of the restraining legs 208 and the relative position of the engagement socket 212 both depend on the desired engagement of the detaching structure 302 and the receiving structure 300, as will be apparent from the description of the attachment process below.

In order to attach the detaching structure 302 to the receiving structure 300, the detaching structure 302 is aligned with the receiving structure 300 such that the hinges 200 on the detaching structure 302 are positioned to correspond with the cams 100 on the receiving structure 300, as shown in FIG. 5. The detaching structure 302 is inserted into the receiving structure 300 at an angle. For clarity, the engagement process will now be described with reference to a single cam 100 and corresponding hinge 200, with the understanding that each step of the engagement process occurs substantially simultaneously for each corresponding cam 100 and hinge 200 pair.

As the detaching structure 302 is pushed toward the receiving structure 300, the distal end of the guiding post 214 on the hinge 200 encounters the arched surface 104. Preferably, the distal end of each restraining leg 208 also contacts the corresponding axle 108; however, such contact is not required. The hinge 200 is free to rotate relative to the cam 100 after such engagement. It is within the scope of the preferred embodiment that the entire engagement surface 102 is the arched surface 104, and the flanking surfaces 106 are not provided. FIG. 6 shows the relationship of the connector 306 to the mating connector 308 as the detaching structure 302 and the receiving structure 300 are first engaged.

The detaching structure 302 is then rotated relative to the cam 100 such that the guiding post 214 rides along the arched surface 104 as it travels toward the opening 110. Each restraining leg 208 preferably maintains contact with and rotates around the corresponding axle 108. The detaching structure 302 moves upward as part of this motion. Thus, the curvature of the arched surface 104 and its height at its rearward end 105 is preferably selected to provide adequate clearance between the connectors 306 associated with the detaching structure 302 and mating connectors 308 associated with the receiving structure 300. Further, it will be appreciated that both the curvature of the arched surface 104 and the length of the guiding post 214 are preferably selected to prevent interference between the connectors 306 associated with the detaching structure 302 and mating connectors 308 associated with the receiving structure 300 at any point during the rotation of the detaching structure 302 around the cam 100.

In a preferred embodiment, during the rotation of the hinge 200 relative to the cam 100, guidance and lateral stability are provided by the engagement assemblies 206 relative to the side walls 114 of the cam 100. The hinge 200 preferably has two engagement assemblies 206, spaced apart a distance slightly larger than the distance between the side walls 114. Preferably, the inner portions of the engagement assemblies 206 are substantially flat and substantially parallel to the side walls 114. Thus, the hinge 200 can freely rotate relative to the cam 100, and the motion of the hinge 200 is constrained by the interaction between the engagement assemblies 206 and the side walls 114. That is, the hinge 100 may only move laterally a distance equal to the spacing between the engagement assemblies 206 and the side walls 114. Further, rotary motion of the hinge 200 is thus substantially limited to a single degree of freedom, as deviations would cause the engagement assemblies 206 to interfere with the side walls 114.

Figure 7:
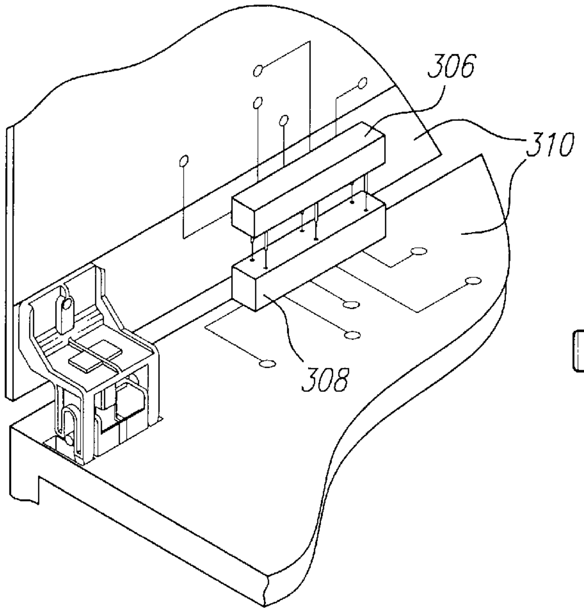
FIG. 7 is a detail view of an electrical connector located on the detaching structure and an electrical connector located on the receiving structure as the detaching structure is about to begin linear motion relative to the receiving structure.

As the hinge 200 rotates, the guiding post 214 approaches the opening 110, and the engagement sockets 212 move upward and rearward. As the hinge 200 nears the end of its rotation, the guiding post 214 begins to move off the rearward end 105 of the arched surface 104, such that only a portion of the distal end of the guiding post 214 is in contact with the arched surface 104. The relationship of the connector 306 to the mating connector 308 is shown in FIG. 7. As rotation of the hinge 200 continues, the guiding post 214 rides off the end 105 of the arched surface 104, terminating rotary motion. The opening 110 has dimensions allowing the guiding post 214 to enter. The hinge 200 then begins substantially linear motion as the guiding post 214 enters the opening 110, under the influence of a linear force. In a preferred embodiment, this linear force is applied by hand, directly or with the assistance of a lever or other structure for applying force known to one of ordinary skill in the art. This linear force may also be gravitational force, if the cam 100 is oriented such that the gravitational force operates in the desired direction relative to the cam 100. It will thus be seen that the cam 100 and hinge 200 may be utilized in a variety of orientations.

Figure 8:
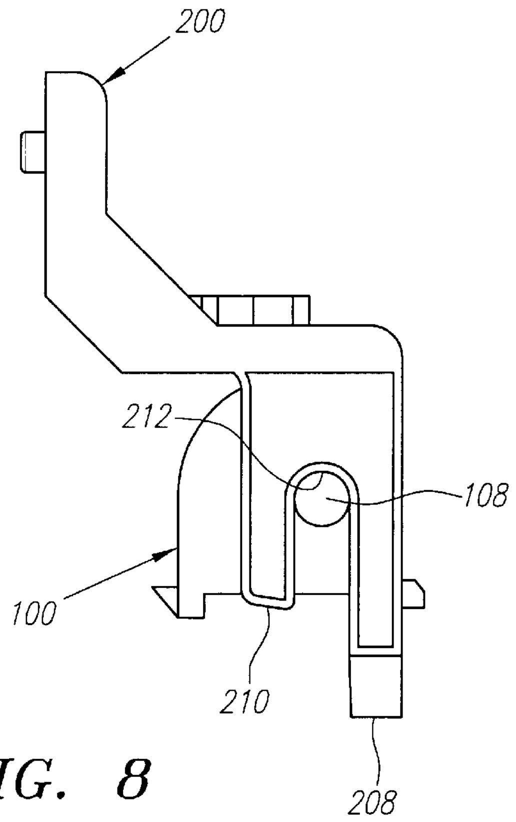
FIG. 8 is a side view of the hinge and cam after linear engagement is complete.
Figure 9:
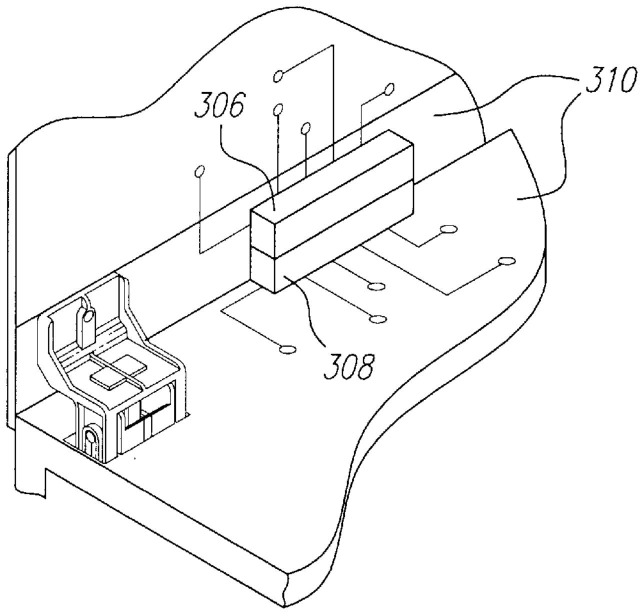
FIG. 9 is a detail view of the engaged electrical connectors after linear engagement is complete.

When linear motion of the guiding post 214 into the opening 110 begins, the engagement sockets 212 are positioned substantially vertically above the corresponding axles 108. As the guiding post 214 linearly enters the opening 110, each engagement assembly 206 traps the corresponding axle 108 between the restraining leg 208 and the alignment leg 210 as the guiding post 214 descends. Referring as well to FIG. 8, the hinge 200 continues moving downward, stopping its downward motion when the engagement socket 212 encounters the axle 108. The relationship between the connector 306 and the mating connector 308 after this engagement is shown in FIG. 9. After the engagement socket 212 engages the axle 108, the detaching structure 302 cannot be moved linearly toward the cam 100 any further. It can thus be seen that the axle 108 may serve as a safety device to prevent excessive pressure from being applied to connectors 306 associated with the detaching structure 302 and connectors 308 associated with the receiving structure 300, respectively. It is within the scope of the preferred embodiment that the downward motion of the hinge 200 is instead stopped by another structure, such as the mating connectors 306, 308 or an associated protective device, such that the detaching structure 302 does not fully engage the receiving structure 300 until a linear force is applied to it, at which point the engagement socket 212 encounters the axle 108 and stops further linear motion of the hinge 200. In a preferred embodiment, the axle 108 is substantially as long as the engagement assembly 206 is thick, to provide secure contact between the axle 108 and the engagement socket 212. Further, the radius of the axle 108 is preferably slightly smaller than the radius of the engagement socket 212, in order to provide secure contact between the axle 108 and the engagement socket 212. It will be seen that the position of the engagement socket 212 relative to the engagement assembly 206 and the hinge 200 will determine the amount of linear travel of the hinge 200 relative to the cam 100. Such amount of linear travel depends on the specific configuration of the detaching structure 302 and the receiving structure 300, and the specific needs of the designer or operator relative to that configuration.

Figure 10:
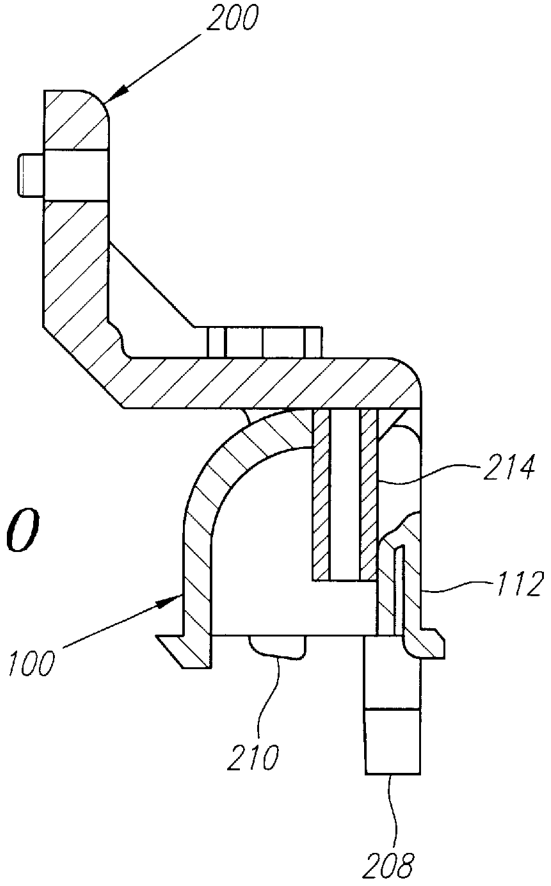
FIG. 10 is a cross-section view of the hinge and cam after linear engagement is complete.
Figure 11:
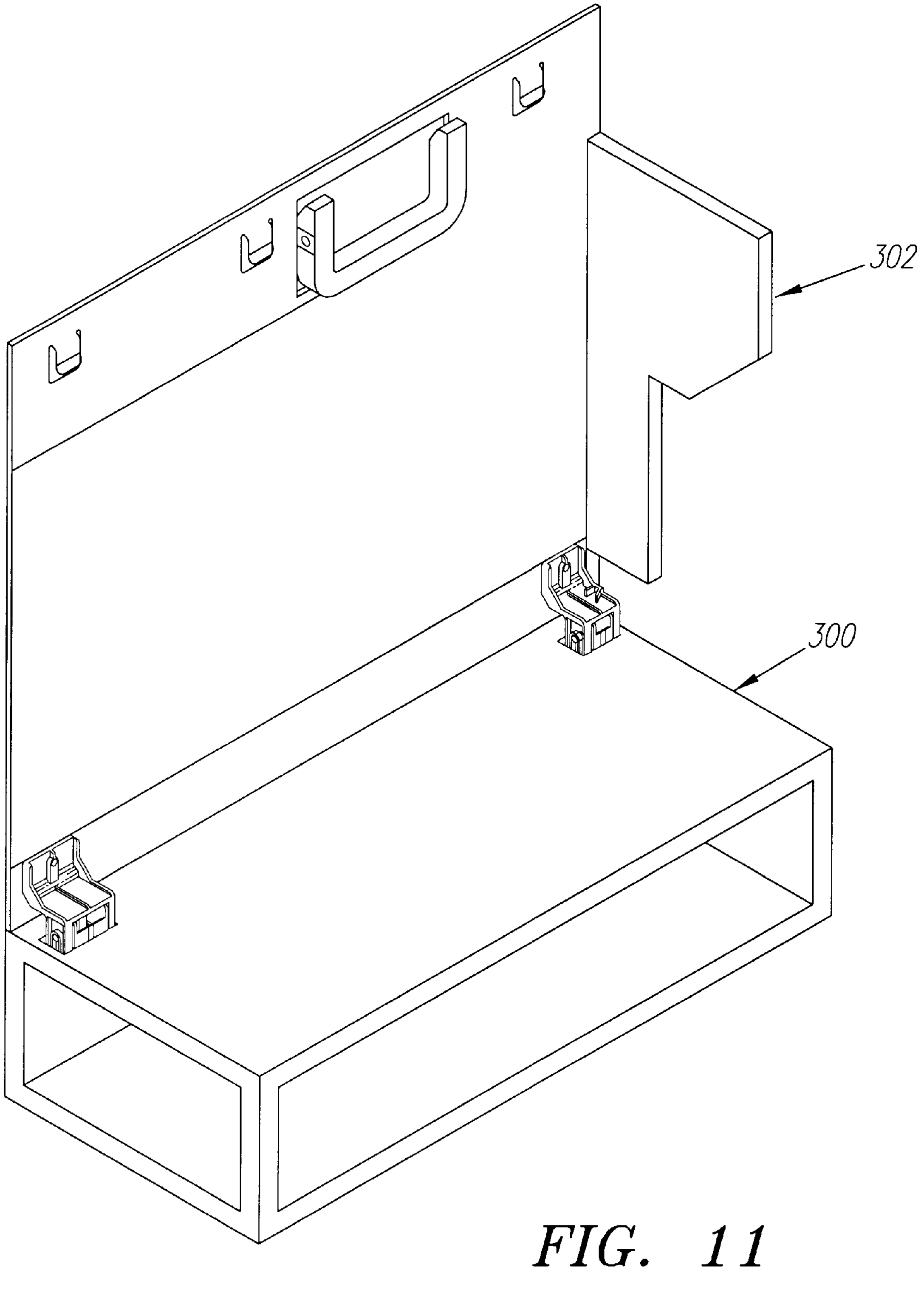
FIG. 11 is a perspective view of a detaching structure mated with a receiving structure via two hinge and cam sets.

Referring as well to FIG. 10, when the motion of the hinge 200 has stopped and the guiding post 214 has come to a stop relative to the cam 100, the rear wall 112 restricts the rearward motion of the guiding post 214, and the upper rearward edge 105 of the opening 110 restricts the frontward motion of the guiding post 214. Thus, in a preferred embodiment the opening 110 and the rear wall 112, in combination with the axle 108 and the engagement socket 212, restrain the hinge 200 in its mated position. Further, this configuration of the opening 110 and the rear wall 112 constrain the guiding post 214 to substantially linear motion during its travel into the opening 110. The receiving structure 300 and the detached structure 302 are thus connected together, as shown in FIG. 11 (for clarity, the connector 306 and mating connector 308 are not shown).

It is within the scope of the preferred embodiment that the axle 108 is not provided, and that linear motion of the hinge 200 stops when the base 202 contacts the cam 100. Where the axle 108 is not provided, the engagement assembly 206 may be shorter than either the restraining leg 208 or the alignment leg 210 provided where the axle 108 is used. Such a configuration may be advantageously used in space-limited applications.

Removal of the detaching structure 302 proceeds in the opposite manner as described above. A linear upward force is applied to the detaching structure 302, causing each hinge 200 to move linearly upward from the corresponding cam 100. The detaching structure 302 is then tilted away from the receiving structure 300 such that the hinge 200 rotates, thus allowing the detaching structure 302 to be pulled away from the receiving structure 300 at an angle.

While the preferred embodiment has been disclosed in terms of the connection between printed circuit boards, the invention is not limited to such use. For example, the invention may be equally useful in other applications where mating connectors must be assembled blindly.

A preferred embodiment of a cam and hinge mechanism for angular insertion of a printed circuit board, and many of its attendant advantages, has thus been disclosed. It will be apparent, however, that various changes may be made in its form and components without departing from the spirit and scope of the invention, the embodiment hereinbefore described being merely a preferred or exemplary embodiment thereof. Therefore, the invention is not to be restricted or limited except in accordance with the following claims and their legal equivalents.

What is claimed is:

1. A connector mechanism, comprising:

a cam comprising an arched surface, an opening at which said arched surface terminates, and an axle; and a hinge comprising:

a guiding post adapted to contact and travel along said arched surface of said cam; and an engagement assembly comprising a restraining leg, an alignment leg, and an engagement socket formed between said restraining leg and said alignment leg, wherein said restraining leg is longer than said alignment leg.

2. The connector mechanism of claim 1, wherein said engagement socket is adapted to engage said axle.

3. The connector mechanism of claim 1, said hinge further comprising two engagement assemblies oriented such that said guiding post is located between said engagement assemblies.

4. The connector mechanism of claim 1, said cam further comprising side walls substantially parallel to one another.

5. The connector mechanism of claim 4, wherein said engagement assembly has an inner surface substantially parallel to one of said side walls of said cam.

6. The connector mechanism of claim 1, wherein said arched surface extends outward and upward relative to said flanking surfaces.

7. The connector mechanism of claim 6, wherein said arched surface is substantially centered between said flanking surfaces.

8. The connector mechanism of claim 1, said cam further comprising a rear wall at the rear of said opening, whereby said rear wall and the edge of said opening at which said arched surface terminates constrain the motion of said guiding post after said guiding post has been inserted into said opening.

9. The connector mechanism of claim 1, further comprising a detaching structure attached to at least one said hinge, and a receiving structure attached to at least one said cam.

10. The connector mechanism of claim 9, wherein said receiving structure is a computer chassis.

11. A connector mechanism, comprising:

a first cam comprising an arched surface and an opening at which said arched surface terminates;

a first hinge comprising a guide post adapted to contact and travel along said arched surface of said first cam; and a second cam and a second hinge having a different width than said first cam and said first hinge.

12. A method for angular insertion and linear engagement of a hinge into a cam, comprising the steps of:

providing said cam having an arched surface terminating at an opening;

providing said hinge having a guiding post;

placing said hinge into contact with said cam such that said guiding post contacts said arched surface;

rotating said hinge relative to said cam such that said guiding post travels along said arched surface until said guiding post rides off said arched surface;

sliding said hinge linearly relative to said cam such that said guiding post enters said opening in said cam; and attaching said cam to a receiving structure and attaching said hinge to a detaching structure;

wherein said receiving structure comprises a first printed circuit board having a first connector and said detaching structure comprises a second printed circuit board having a second connector, said method further comprising the steps of correspondingly engaging said first connector with said second connector as said guiding post enters said opening in said cam.

13. The method of claim 12, further comprising the steps of attaching said cam to a receiving structure and attaching said hinge to a detaching structure.

14. The method of claim 12, wherein said cam further comprises a plurality of axles aligned substantially along a common centerline and said hinge further comprises a corresponding number of engagement assemblies each having a restraining leg, an alignment leg, and an engagement socket between said restraining leg and said alignment leg, further comprising the step of engaging said axles in said corresponding engagement sockets.

* * * * *